Sept. 6, 1932.   J. R. HUGHES   1,875,925
VEHICLE HOOD
Filed March 20, 1929   2 Sheets-Sheet 1

INVENTOR.
James R. Hughes
BY
ATTORNEY

Sept. 6, 1932.    J. R. HUGHES    1,875,925
VEHICLE HOOD
Filed March 20, 1929    2 Sheets-Sheet 2

INVENTOR.
James R. Hughes
BY
ATTORNEY

Patented Sept. 6, 1932

1,875,925

UNITED STATES PATENT OFFICE

JAMES R. HUGHES, OF SOUTH BEND, INDIANA, ASSIGNOR TO THE PIERCE-ARROW MOTOR CAR COMPANY, OF BUFFALO, NEW YORK, A CORPORATION OF NEW YORK

VEHICLE HOOD

Application filed March 20, 1929. Serial No. 348,530.

This invention relates to hoods for motor vehicles, motor trucks and the like and particularly to means for ventilating the hood.

The principal object of my invention is to provide the hood with ventilating openings in the sides thereof, together with shutters for controlling the respective openings, means being provided to latch the shutters in closed position and having spring means for urging the shutters toward opened position.

A further object is to provide shutters for the openings in the sides of the hood which are substantially flush with the hood when the shutters are in closed position.

A further object is to provide a spring pressed latch mounted on the inside of the hood for securing the shutters in closed position.

A still further object is to provide shutters for the openings in the hood so mounted that the hinges therefor are concealed from view and having spring means for holding the shutters in opened position.

The above being among the objects of the present invention the same consists of certain features and combination of parts to be hereinafter described, and then claimed, having the above and other objects in view.

In the accompanying drawings which illustrate a suitable embodiment of my present invention, Figure 1 is a perspective view of the hood, certain parts of the automobile body and chassis being in dotted lines to more clearly show my invention.

Figure 1:
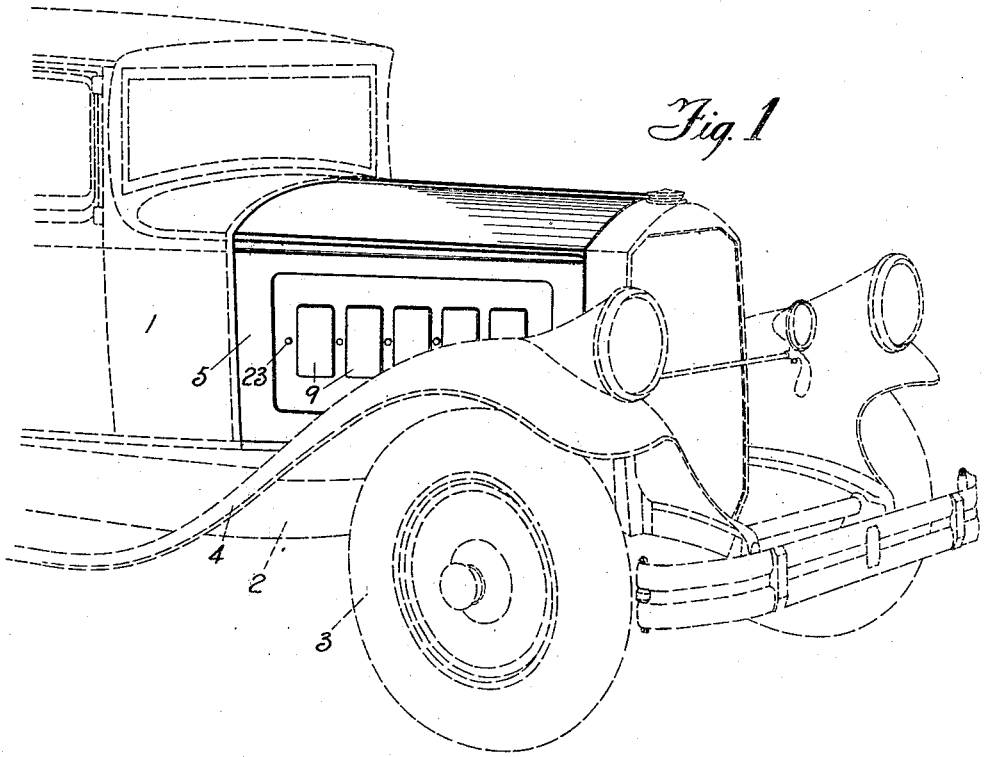
Figure 2:
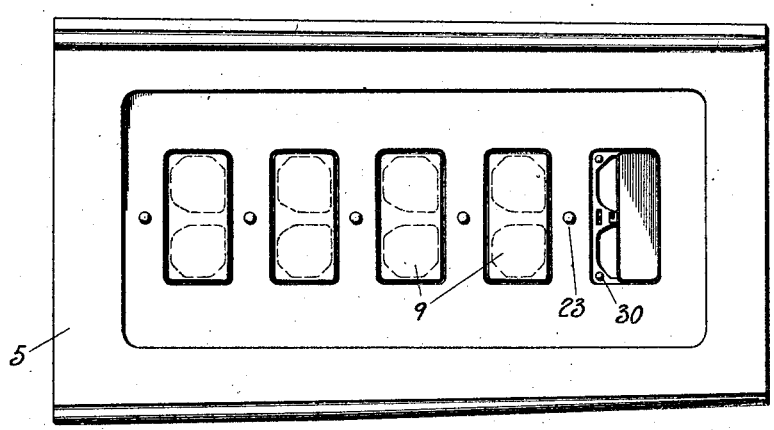
Figure 2 is a side elevation of the hood, showing several of the shutters in closed position and the right hand shutter in opened position.
Figure 4:
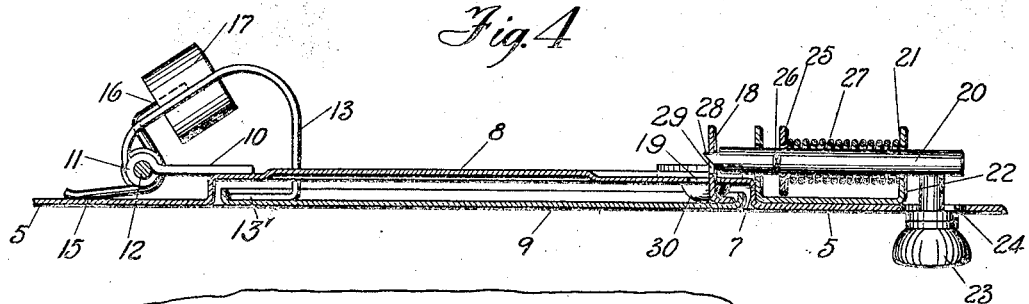
Figure 4 is a sectional view taken on the line 4—4 of Figure 3, showing a portion of the hood, the shutter, the mounting therefor and the latch mechanism for holding the shutter in closed position.
Figure 3:
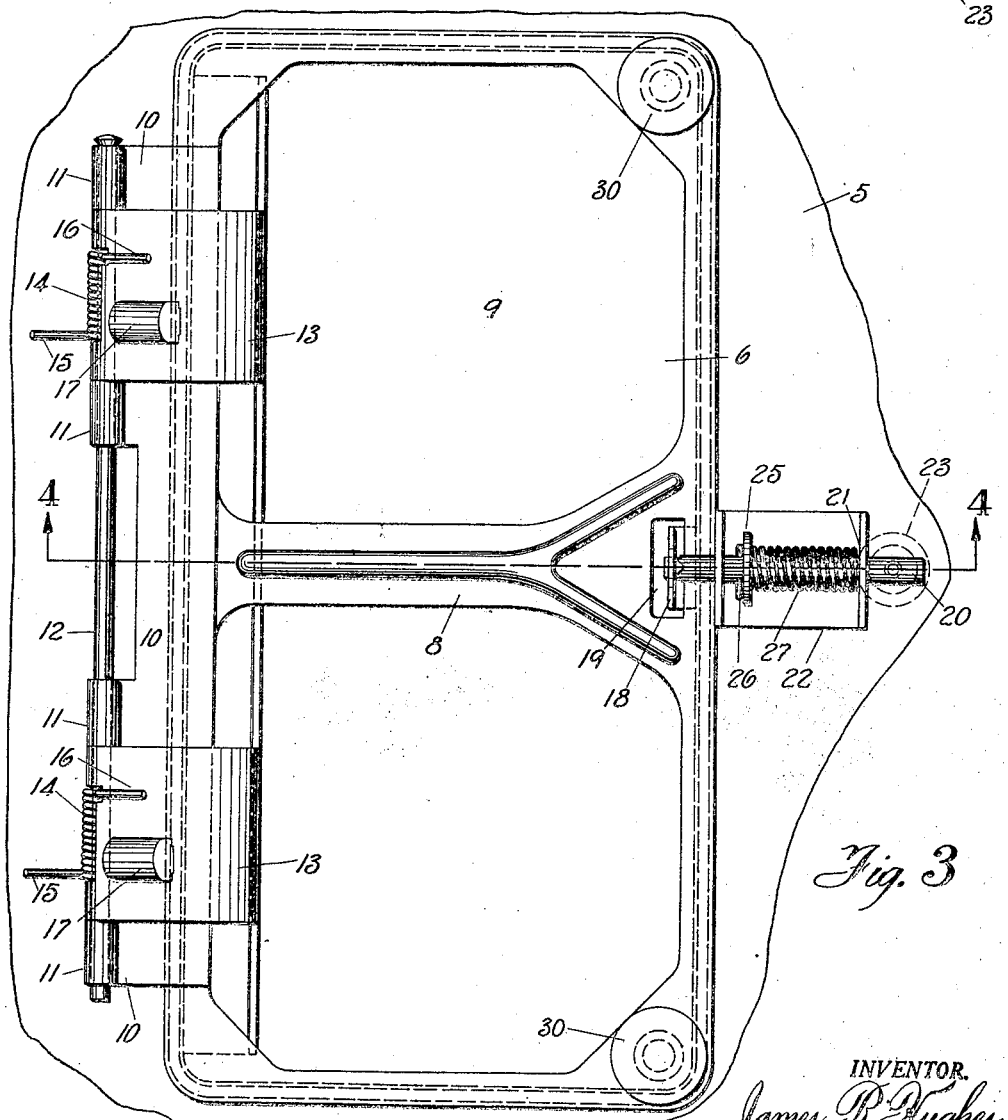
Figure 3 is an enlarged fragmentary elevational view of the hood looking from the inside thereof, showing the shutter in closed position.

Referring to the numbered parts of the drawings in which like reference numerals refer to like parts throughout the several views, I have shown in Figure 1 an automobile body 1 mounted on a chassis frame 2 supported by front wheels 3 and having fenders 4 protecting the same. The hood 5 is provided with a plurality of openings 6 therein formed by depressing the metal at 7 and cutting away the portions of the metal as is clearly shown in Figure 3. A stiffening rib 8 extends centrally of the opening 6 to provide a more rigid structure and thus prevent twisting and distortion of the hood side panels which otherwise would result in the cutting away of the large portions of metal to provide the ventilated openings. Shutters 9 preferably formed of sheet metal are mounted in the depressed portions of the hood side members 5 so that their outer faces are substantially flush with the hood when the shutters are in closed position. Hinge brackets 10 are welded or otherwise secured to the hood on the inner face thereof as is shown in Figures 3 and 4, the free ends of the brackets being looped at 11 to receive the pintle 12. Hinge members 13 extending from the plate 13' welded or otherwise secured to the shutters 9 as shown in Figure 4 are looped around the edge of the opening 6 in the hood 5 and are connected at their free ends to the pintle 12 to form a hinge connection for the shutters 9. A plurality of coil springs 14 are mounted on the pintle 12 with one end 15 thereof resting against the inner face of the hood 5 and the opposite end 16 bearing against the inner face of the hinges 13. As shown in Figure 4 the springs 14 are held under compression so that as the latch mechanism hereinafter to be described is released, the springs will automatically move the shutter to open position as is shown in Figure 2. A resilient member 17 is mounted on each hinge 13 and is adapted to contact with the hinge bracket 10 when the door is swung to open position. These resilient members may be of rubber or similar material to prevent the rattling of the shutters and also provide stops to limit the amount which the shutters will open.

An angle bracket 18 is welded or otherwise secured adjacent the free edge of the shutter 9 on the inner face thereof and extends through an opening 19 formed in the stiffening member 8 to provide a keeper for the latch mechanism. A sliding latch 20 is mounted in openings 21 formed in a U-shaped bracket 22 welded or otherwise secured to the inner face of the hood 5, the latch being moved to operative and inoperative position by means of the handle 23 extending through a slot 24 formed in the hood 5 so that the handle can be operated on the outside of the hood in a convenient manner. The latch bolt 20 has a washer 25 mounted thereon adapted to engage with a cotter pin 26 secured in the latch member 20 to form an abutment for a spring 27 positioned between the washer 25 and one of the sides of the U-shaped member 22. It will thus be seen that the spring normally moves the latch 20 to extended position so that the end 28 thereof will be received in the slot 29 formed in the angle bracket 18 secured to the shutter 9 as is clearly shown in Figure 4. When it is desired to open the door the handle 23 is moved to the right as shown in Figure 4 and the latch 20 is moved therewith against the compression of the spring 27 so that the end 28 of the latch 20 will be released from the keeper 18 which will permit the door 9 to swing to open position because of the action of the spring 14 interposed between the hood 5 and the hinge member 13. Resilient abutments such as 30 are mounted on the hood 5 and are adapted to engage with the inner face of the shutter 9 when the same is closed to thus prevent rattling of the shutter and to provide a stop for the inward movement of the same.

While I have shown one embodiment of my invention, it is to be understood that formal changes can be made therein without departing from the spirit and substance of my invention, the scope of which is commensurate with the appended claims.

What I claim is:

1. In a vehicle, the combination with a hood having an opening therein and an offset flange parallel to the plane of the hood surrounding said opening, of a shutter for said opening adapted to cover said opening and said flange and having its outer face substantially flush with the outer face of said hood, a hinge for said shutter supported on the inner face of said hood and passing around said flange, spring means cooperating with said hinge for urging said shutter to open position, and a sliding latch bolt having an operating handle on the outside of said hood, supported on the inner face of said hood for securing said shutter against the action of said spring in closed position.

2. In a vehicle hood having a series of spaced openings therein, an inwardly offset flange surrounding each opening, an integral brace element extending between adjacent vertical flanges dividing each opening into an upper and a lower portion, a reinforcing bead in each said brace portion, a shutter adapted to cover said openings, said flanges and said brace portions, a hinge for each shutter secured to said hood, a spring associated with each hinge for urging said shutters toward open position, and latches secured to said hood for securing said shutters in closed position.

3. In a vehicle hood having a series of spaced openings therein, an inwardly offset flange surrounding each opening, a shutter for each opening adapted to cover said opening and said flange, a hinge for each shutter, a spring incorporated with each hinge for urging the shutters toward open position, a latch for each shutter to secure said shutter in closed position, resilient members mounted on each flange to prevent said shutters from rattling against said flanges when closed, and resilient means carried by each hinge to prevent said hinges from rattling against said flanges when said shutters are open.

Signed by me at South Bend, Indiana, this 18th day of March, 1929.

JAMES R. HUGHES.